United States Patent [19]
Barish

[11] Patent Number: 5,456,275
[45] Date of Patent: Oct. 10, 1995

[54] SANITARY CONTAINER FOR ICE CREAM SCOOPS

[76] Inventor: Sidney Barish, 55 Newkirk Rd., North, Richmond Hill, Ontario, Canada, L4C 3G4

[21] Appl. No.: 115,189

[22] Filed: Aug. 31, 1993

[30] Foreign Application Priority Data

Oct. 21, 1992 [CA] Canada .................................. 2081078

[51] Int. Cl.⁶ ...................................................... B08B 3/04
[52] U.S. Cl. ...................... 134/104.4; 134/186; 134/201; 312/229
[58] Field of Search ..................... 134/155, 106, 134/201, 901, 25.2, 104.4, 91, 92; 312/249.8, 252; 4/223; 239/37, 38, 172; 220/DIG. 8; 62/1, 371, 372, 455.1, 3.61; 280/421, 651, 652, 659; 126/276; 137/312, 313

[56] References Cited

U.S. PATENT DOCUMENTS

| | | |
|---|---|---|
| 1,297,630 | 3/1919 | Zawisza . |
| 1,727,395 | 9/1929 | Coffey . |
| 2,287,500 | 6/1942 | Solinas .................................... 134/201 |
| 2,636,501 | 4/1953 | Hilliker ................................... 134/914 |
| 2,862,758 | 12/1958 | Robertson . |
| 3,169,539 | 2/1965 | Van Der Feer ......................... 134/155 |
| 3,748,437 | 7/1973 | Keeshin et al. . |
| 4,120,547 | 10/1978 | Price et al. ............................. 134/155 |
| 5,156,813 | 10/1992 | Calhoun ............................. 134/186 X |
| 5,186,194 | 2/1993 | Kitajima ............................. 134/155 X |
| 5,277,209 | 1/1994 | Olson ..................................... 134/201 |

Primary Examiner—Frankie L. Stinson
Attorney, Agent, or Firm—Bauer & Schaffer

[57] ABSTRACT

A method and apparatus for keeping an implement such as an ice cream scoop clean during prolonged use, particularly in mobile vending situations. In the example a bowl is described, fitted inside a second bowl; the scoop is placed inside the first bowl, and this bowl is filled with water. A fresh water holding tank is provided above, and water is dripped slowly by means of a spigot into the first bowl, which overflows into the second. Media such as protein and sugar that potentially support bacterial growth is carried off in the overflow, adhering to fats and oils in the ice cream which float on water. This waste water is collected in a tank connected to the second bowl. No electricity or pressurized water is necessary with this system.

4 Claims, 2 Drawing Sheets

SANITARY CONTAINER FOR ICE CREAM SCOOPS

The multiplication of bacterial organisms is a continuing problem in the food service industry; the problem being exacerbated by the fact that some foods—and ice cream in particular—are always more in demand in hot weather. Thus an ice cream vendor must make provision for keeping serving implements clean in adverse conditions, since bacteria multiply much faster in heat. In the situation where the vendor is selling from a portable stand—as is very common for ice cream—the further complication arises of a lack of electricity or other power for cooling machines.

The inventor has accordingly devised a simple mechanism for allowing ice cream scoops to be used, and sit between uses, in an acceptably hygienic manner, without the need for any external power. The only material used—apart from the apparatus itself—is clean water.

A study of the relevant prior art shows nothing relating directly to the apparatus to be described, and what has been found would need substantial modification to apply to the situation in question. U.S. Pat. Nos. 2,164,258, Frank Schultz; and 2,287,500, Peter Solinas, show devices that pump water up under pressure into the bottom of a container containing beer combs, and, in the case of Solinas, beer combs and cocktail mixers. Both require pressurized water supplies, which is a serious complication for a mobile vender. Plus no provision is made for collection of the grey-water overflow, which is presumably simply piped into a sink and down a sewer. Canadian Patent No. 358725, Nebraske, also shows a beer comb holder with water applied; in this case the water flows down a pipe inside the holder, and is released at the bottom of the combs. Although in this configuration water can be imagined to "fall" from the spigot, in practice a pressurized flow would again be required: otherwise the fresh water would simply sit in the inflow tube and not force the container having either an open top or a hole near the top edge for the liquid to escape when additional quantity of said liquid is added; flowing or dripping additional supplies of liquid into the top of the container by gravity feed, such that waste liquid overflows the container or flows out said hole; the waste liquid being the original liquid mixed with the contaminant or potentially contaminant substance or the contaminant or potentially contaminant substance together with the second substance; whereby the implement placed in the container will be rinsed clean of contaminant or potentially contaminant substances, these substances being carried to the top of said liquid and overflowed down the outside of the container.

A further object is to provide such a method method designed for use in situations where neither pressurized liquid nor electricity are convenient, such as mobile food vendoring, and in which the additional supplies of liquid described come from an upper holding tank situated above the container; and in which a means of collecting waste liquid, such as a lower holding tank, is also provided.

A further object is to provide an apparatus for maintaining an implement, tool, or other object free of a contaminant substance or potentially contaminant substance that floats on a liquid or adheres to some second substance that floats on a liquid, comprising an open-topped liquid-tight container into which the implement, tool, or other object can be placed; the container optionally having a hole near its top edge to allow excess liquid to escape; liquid filling the container, either to the top edge or to the level of said hole; an upper holding tank, situated above the container, with further supplies of said liquid; means to allow said liquid to drip from said holding tank into said container; means to collect waste liquid that overflows said container or out said hole.

DETAILED DESCRIPTION OF THE INVENTION

Figure 1:
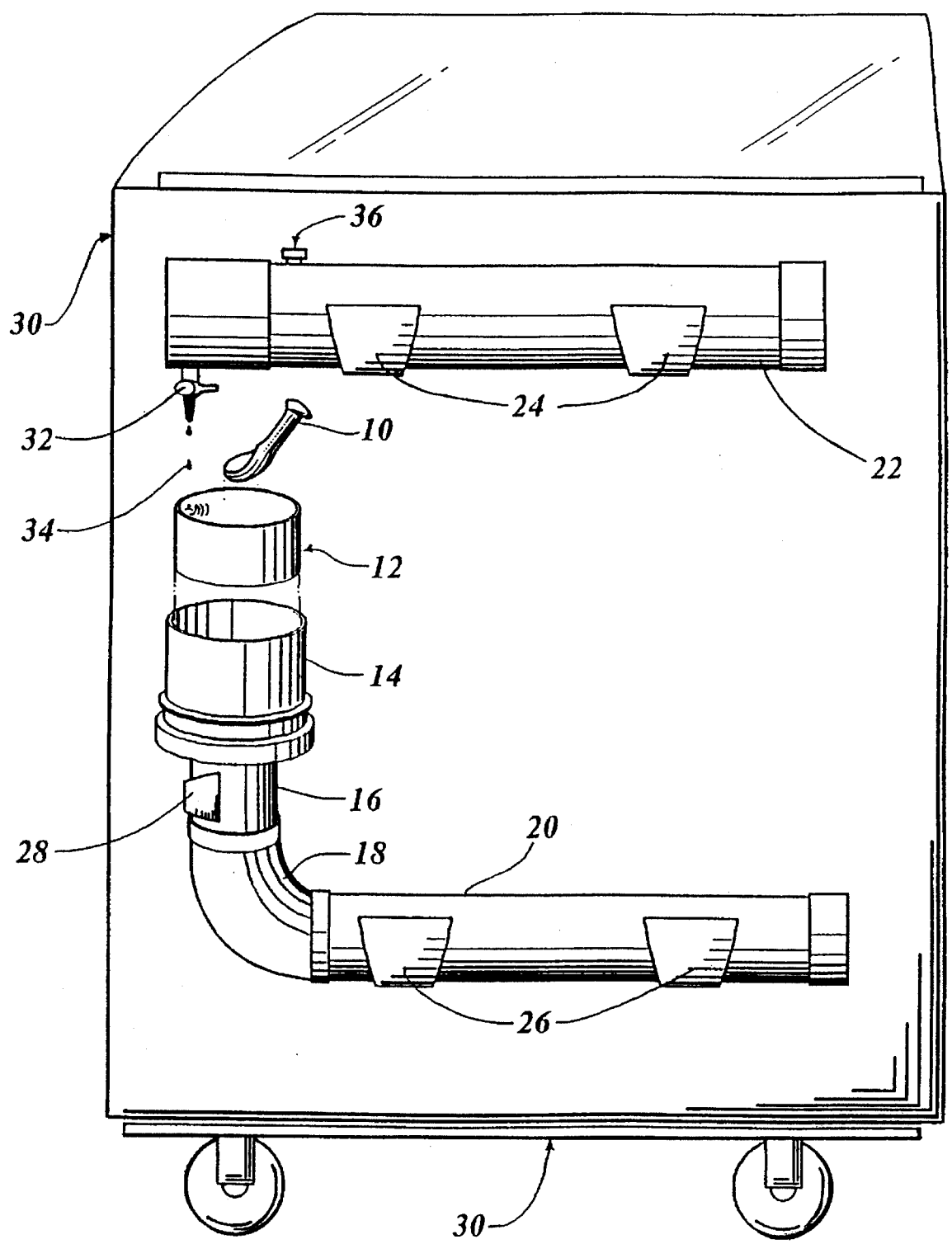
Figure 2:
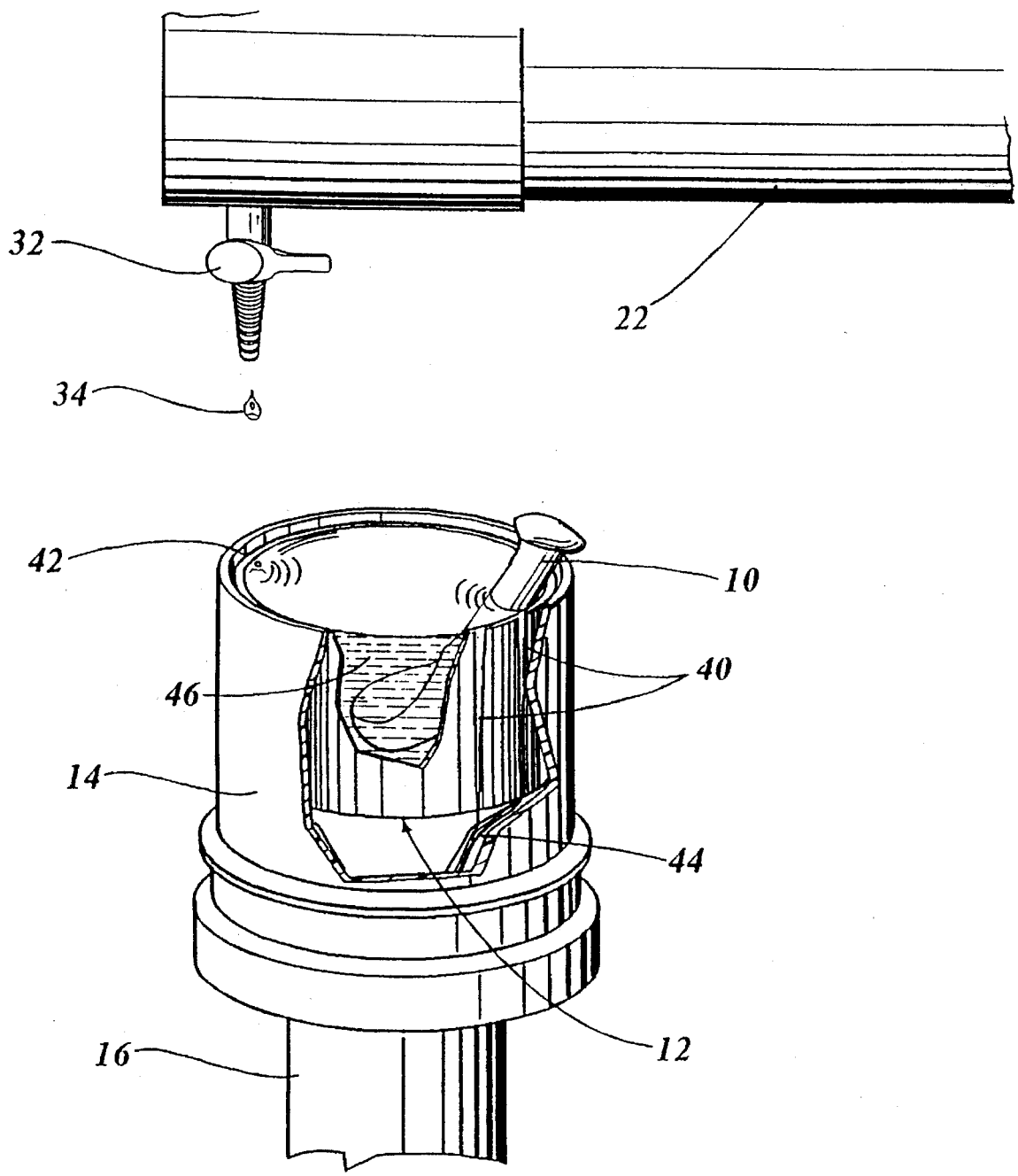

For this description, refer to the following diagrams, wherein like numerals refer to like parts:

FIG. 1, is a front elevation view of the invented hygienic implement holder, with a portion shown in exploded view; and FIG. 2, invented hygienic implement holder, enlarged front elevation view, with cutaway section.

In this example of the invented system, as seen in both FIGS. 1 and 2, scoop 10 sits in scoop bowl generally indicated as 12, which fits into sleeve 14 fitted over tube 16. In FIG. 1, tube 16 is joined by connector 18 to holding tank 20. Fresh water tank 22 is suspended above, here by brackets 24 securing it to a mobile vending freezer generally indicated as 30. Holding tank 20 and attached parts 18, 16, and 14 are also secured to mobile freezer 30; by brackets 26 and 28. Spigot 32 allows water droplets 34 to fall from the fresh water tank 22; tank 22 can be refilled through capped filler hole generally indicated as 36. A small hole (not shown) either in this cap or elsewhere on the top of the fresh water tank 22 allows air to enter tank 22 and equalize the pressure so that droplets 34 can continue to fall.

In practice, fresh water tank 22 is filled with clean water, as is bowl 12; and spigot 32 is set for a flow of drops. Referring now to FIG. 2, it can be seen that small streams of liquid 40 will periodically overflow top lid 42 and run down the interior of sleeve 14 as indicated by stream 44, and thence down tube 16 into holding tank 20 (Seen on FIG. 1). Since ice cream is generally made up of large amounts of materials that are lighter than water (i.e., fats and oils), these materials will be selectively removed from the water 46 in bowl 12 because they will float to the top and flow out in streams 40 as explained. Proteins and sugars (not indicated on diagrams) mixed in the ice cream will characteristically be continuously carried away by these fats and oils; any existing bacterial already in the ice cream (not shown) or falling on the container will also be removed before any growth can occur. All that remains is that the collected waste water (not shown) inside tank 20 as seen on FIG. 1 will be removed, either at the end of a working day or when tank 20 is full.

The foregoing is by example only, and the scope of the invention should be limited only by the appended claims.

The embodiments of the invention in which an exclusive property or privilege is claimed are defined as follows:

1. In a food vendor's cart or vehicle, apparatus for maintaining an implement, tool, or other object free of a contaminant substance or potentially contaminant substance that floats on a liquid or adheres to some second substance that floats on a liquid, said apparatus comprising a first container having an open top normally filled to overflowing with a liquid and in which said implement, tool, or other object can be placed, a liquid holding tank situated above said first container having a supply of said liquid, means for causing said liquid to constantly drip from said holding tank into said first container to maintain said first container continually overflowing and a second container in which said first container nests to collect the overflowing liquid therefrom.

2. An apparatus according to claim 1, wherein said first container is provided with a hole adjacent its top edge to facilitate overflow of liquid.

3. An apparatus as in claim 1, in which the means to cause said liquid to drip is a spigot which can control the flow rate of the liquid.

4. An apparatus as in claim 1, in which the said second container is connected to a lower holding tank.

* * * * *